United States Patent Office.

JOHN K. MAYO, OF NEW YORK, N. Y., FOR HIMSELF, AND ANDRE CUSHING AND GEORGE B. CUSHING, OF ST. JOHN, NEW BRUNSWICK, ASSIGNEES OF JOHN K. MAYO.

*Letters Patent No.* 51,735, *dated December* 26, 1865; *reissue No.* 3,085, *dated August* 18, 1868.

DIVISION A.

IMPROVED MATERIAL FOR VARIOUS STRUCTURES.

The Schedule referred to in these Letters Patent and making part of the same.

TO ALL WHOM IT MAY CONCERN:

Be it known that JOHN K. MAYO, formerly of Portland, Maine, but now of the city, county, and State of New York, invented a new and useful Material for the Formation, Covering, or Lining of Various Structures; and the following is hereby declared to be a full, clear, and exact description of the said invention, reference being had to the accompanying drawings, which are made part of this specification, and which illustrate the mode of combining sheets of wood with the grain crossed or diversified.

The terms "scale" and "scale-board" in this specification refer to a thin sheet of wood cut from a board, plank, or log.

The invention consists in cementing or otherwise fastening together a number of these scales or sheets, with the grain of the successive pieces, or some of them, running crosswise, or diversely from that of the others.

A number of these scale-boards, their surface having been previously treated with cement or analogous material, are so placed together that the joints or edges of one layer are covered by the next, and so as to cross or diversify the direction of the grain of the respective pieces, in order to form a firm material for any and all structures for which it may be found adapted. The thinness of the layers of wood adapts them to readily assume various forms or figures, or to be laid upon irregular objects. The pliability and toughness of the wood for use in this manner may be increased by the well-known process of wet and dry heating.

The crossing or diversification of the direction of the grain is of great importance to impart strength and tenacity to the material, protect it against splitting, and at the same time preserve it from liability to expansion or contraction.

By graduating the thickness of the scales more or less, cement may enter into the combination of this material, and thus it may be more entirely adapted to different manufactures. Its ductile or pliable state in process of manufacture is a valuable feature, inasmuch as it may be formed into almost any desirable shape, either within a matrix or upon an outside former, thereby saving the cost of moulding or carving.

By the application of pressure in any of the various forms, by mechanical appliances, the cement is made to permeate the wood, and brings the fibre of the latter in close contact and union, and preserves it from decay.

By the use of different kinds of cement or modes of treatment in process of manufacture. articles may be made very firm and rigid or flexible in their character.

By the combination of the wood scales in the manner described, we secure the superior strength of the fibre in line with its grain in all directions, thus imparting an exceeding tenacity and toughness, corresponding to that of metals; hence it is manifest that in all cases where fastenings of rivets, bolts, spikes, or nails are required, either for more firmly connecting the laminæ or in connecting separate sections in course of structure, reliance may be placed in such fastenings, and security result, in the strength of the material to hold them.

It is impossible to anticipate all the various uses to which the above-described compound scale-board may be applied, but suffice it to say that by the means employed, a very strong and light structure is made, of whatever shape, and for whatever purpose it may be designed.

The following is what is desired to be secured by Letters Patent as the invention of the said JOHN K. MAYO:

A compound scale-board, consisting of a plurality of thin sheets, scales, or layers of wood, connected together with the grain in divers directions, as a material for manufactures, and for the formation, lining, or covering of land or marine structures.

JOHN K. MAYO,

Witnesses:
EDWARD WILLARD,
S. W. FROST.